WIRE PRINTER

Filed Dec. 22, 1958 8 Sheets-Sheet 1

INVENTORS
FRED SALTZ
EDWARD J. GRENCHUS
BY Melvin P. Williams
AGENT

WIRE PRINTER

Jan. 30, 1962 F. SALTZ ETAL 3,018,722

WIRE PRINTER

Filed Dec. 22, 1958 8 Sheets-Sheet 7

United States Patent Office 3,018,722 Patented Jan. 30, 1962

3,018,722
WIRE PRINTER

Fred Saltz, Binghamton, and Edward J. Grenchus, Johnson City, N.Y., assignors to International Business Machines Corporation, New York, N.Y., a corporation of New York Filed Dec. 22, 1958, Ser. No. 782,098
13 Claims. (Cl. 101—93)

This invention relates to wire printers and more particularly to apparatus for displacing the wires in accordance with the character to be printed.

This form of printing is well known and is illustrated by U.S. Patent No. 2,730,040, R. B. Johnson, January 10, 1956. Selected wires are displaced from the normal plane of wire ends in a matrix, and the matrix is then forced against an inked ribbon or the like whereby the selected wires print the desired character. The value of this type of printing is the high speed at which the characters can be changed and the new characters printed in response to record cards or other control. The speed of printing has heretofore been limited by the time required for reliable setup mechanisms to change the character defined by the displaced wires.

Accordingly, the main object of the invention is to provide a fast, simple, and reliable setup device for a wire printer.

Another object is to provide a wire printing device in which selective set up of the matrix wires takes place without stopping the character defining means.

Briefly described, the invention comprises a print wire displacing device which continuously presents in succession a plurality of different character-setting elements to the control ends of the print wires, and in which contact is effected between the print wires and selected ones of said elements; for example, one embodiment of said device is a continuously rotating code drum having patterns of recesses respectively corresponding to different characters which may be set up for printing. In the drum embodiment, the control ends of the wires are arranged adjacent to the drum in a pattern corresponding to said recess patterns, the recesses being aligned with those of the print wires which do not impress the ribbon in printing the corresponding character. When the correct code pattern is passing said wire ends, the wires and drum are brought into mutual contact; the wires aligned with recesses extend further at the control ends after contact, which results in the wires not aligned with recesses being extended from the normal plane of the matrix at the print ends thereof, rendering them effective to impress the correct character; the character so defined is then stored, in the form of displaced wires, until print time.

Other objects of the invention will be pointed out in the following description and claims and illustrated in the accompanying drawings, which disclose, by way of example, the principle of the invention and the best mode which has been contemplated of applying that principle.

*Setup mechanism code drum*

Figures 1, 2:
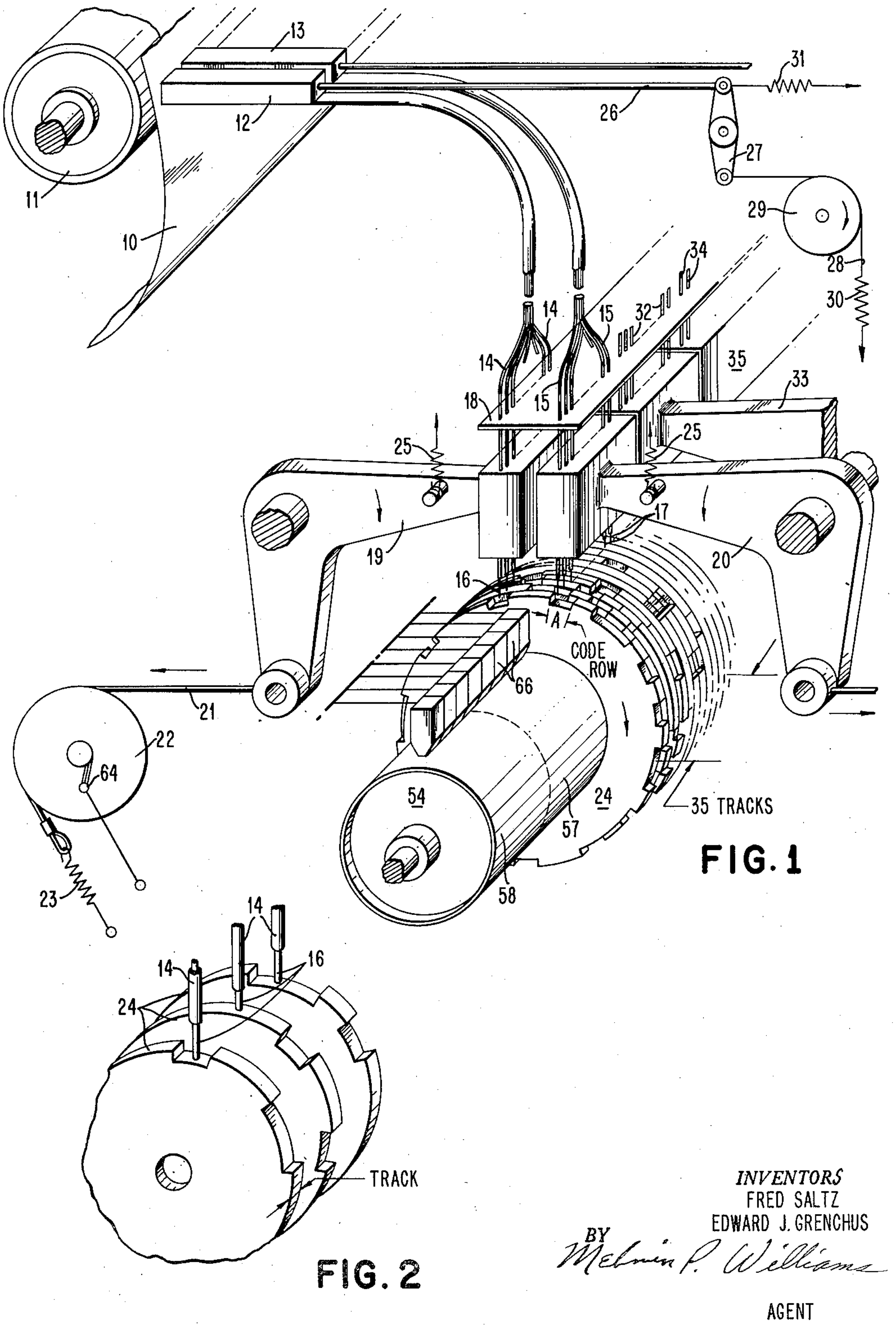
FIG. 1 is a perspective of a code drum and apparatus for the setting up of the wires in two print heads, in accordance with one embodiment of the invention.
FIG. 2 is a simplified perspective of the code drum illustrating the relationship between the wires and the drum.

In one illustrative embodiment of the invention shown in FIG. 1, a code drum 24 comprises a plurality of peripheral tracks, one for each print wire 16, 17 in a print head 12, 13. Each track has 50 sectors that comprise projections or recesses, which will displace or not displace, respectively, the print wire according to its position in the matrix and the character being set up therein. Thirty-five tracks are needed to accommodate the thirty-five print wires 16, 17 in the matrix of each print head 12, 13. The individual sectors in each track combine with adjacent sectors of other tracks to form code rows, for instance, row A shown beneath the print wires 17 of the print head 13.

Also shown in FIG. 1 is a record sheet 10 which is to be printed, and which feeds between a platen 11 and a ribbon (not shown). The ribbon passes between the record sheet 10 and the print heads 12, 13. The setup mechanism associated with the print head 12 is identical with that of print head 13; for clarity, this embodiment will be described with reference to print head 12 only. The print head 12 confines the print ends of thirty-five tubes 14 so as to form a matrix of five vertical columns having seven tubes in each column. Within each tube 14, a print wire 16 is held with a slight frictional force which permits longitudinal sliding within the tube when forced, but prevents slipping of the wire in the tube when not forced. At their setup ends, the tubes 14 are loosely guided by a plate 18 and are constrained within the head of a bell crank 19, which is pivotally connected to a strap portion 21 of an electrostatic clutch 22, the strap 21 being under the tension of a spring 23. When the longitudinal code row on a code drum 24 adjacent to the row of wires coincides with the character to be printed, the electrostatic clutch 22 is actuated, in a manner hereinafter described, causing the strap 21 to be pulled to the left by the counterclockwise rotation of the clutch and the tension of the spring 23. The strap 21 rotates the bell crank 19 clockwise and the tubes 14 are forced down toward the code drum 24; the wires 16 within the tubes 14 contact the drum, and as seen in FIG. 2, those wires meeting a projection are stopped and caused to slide within the tubes toward the print ends thereof. After contact of the wires with the drum has been made, the electrostatic clutch 22 is disenergized and the bell crank 19 rotates counterclockwise to its rest position under the action of a spring 25. The tubes are sufficiently flexible to allow the bell crank to move freely, and the light frictional force between the wires and their containing tubes holds the displaced wires in a displaced position within their respective tubes. Anytime thereafter, the print head 12 may be driven toward the ribbon (not shown) by a rod 26 which is supported and driven by a crank 27 rotatable by a band 28, a clutch 29 and a spring 30, which operate the same as the setup clutch assembly 21, 22, 23. Since the tubes are fixed within the head, and the wires may slide within the tubes when forced only, the wires displaced by the setup mechanism will extend past the normal plane of the matrix (coincident with the ends of the tubes) and will contact the ribbon, thereby printing a group of dots arranged to form a numeral, an alphabetic letter, or some special character. The print head continues to advance toward the platen after the selected wires have contacted the ribbon and these wires then slide within their tubes, the friction therebetween providing the impressive force to effect printing. The print clutch is then disengaged and a spring 31 returns the print rod 26 and print head 12 to the normal position toward the right.

In FIG. 1 two print positions are shown corresponding to print head 12, tubes 14, wires 16 and bell crank 19, and to print head 13, tubes 15, wires 17 and bell crank 20. Additional print positions are indicated by tubes 32 and bell crank 33, and by tubes 34 and bell crank 35. By taking into account the different times at which a character code row will become adjacent to the rows of print wires, any number of print setup positions may be arranged about the drum to utilize a group of thirty-five tracks, subject to mechanical space limitations.

Figure 3:
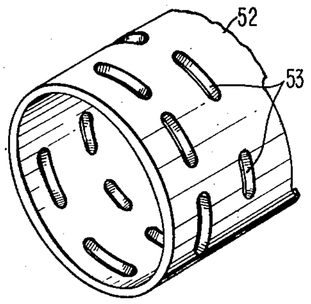
FIG. 3 is a simplified perspective of an alternative drum construction form.

FIG. 2 shows the details of the code drum 24 made up of track sections having notches machined therein for selectively preventing the displacement of the non-printing wires. These sections are fastened together to form an integral code drum. FIG. 3 shows an alternative construction of a code drum in which a hollow cylinder 52 has peripheral slots 53 machined therein corresponding to the wires not to be displaced.

Figure 4:
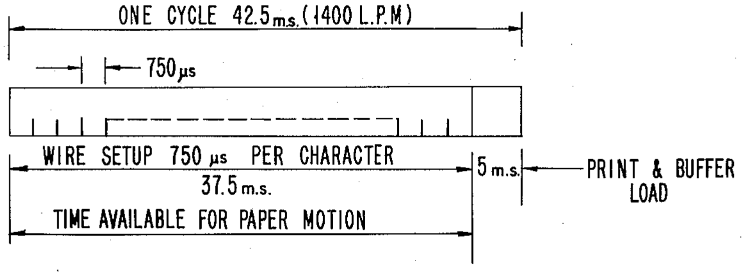
FIG. 4 is a chart illustrative of the timing of an ordinary printing cycle.

Turning now to FIG. 4, a 1400 line per minute printer of the type described, allowing 5 milliseconds for printing and the remainder of the cycle for the above-described setup of print wires and paper motion, would have 37.5 milliseconds of setup time, and assuming a total of 50 possible characters, there would be 750 microseconds per character available for setup. Moving the paper to index the next portion thereof for printing inherently requires a large portion of a cycle, and the paper is stopped only long enough for printing. As before described, the setting up takes place at any moment during the cycle in which the code row representing the character desired and the row of wires that will print the character become adjacent. The character to be printed is then stored in the form of wires displaced within their tubes until the last part of the cycle when printing occurs. The code drum continuously rotates, and according to the above mode of timing, several character rows may pass by during print time, but since the character rows are identified by a spot code, to be described later, on a magnetic drum 54 (FIG. 1), rotated in unison with the code drum, and since sufficient time is allowed to scan all characters during the first part of each cycle, the only effect is to alter the first character to be presented in each subsequent cycle.

Figure 5:
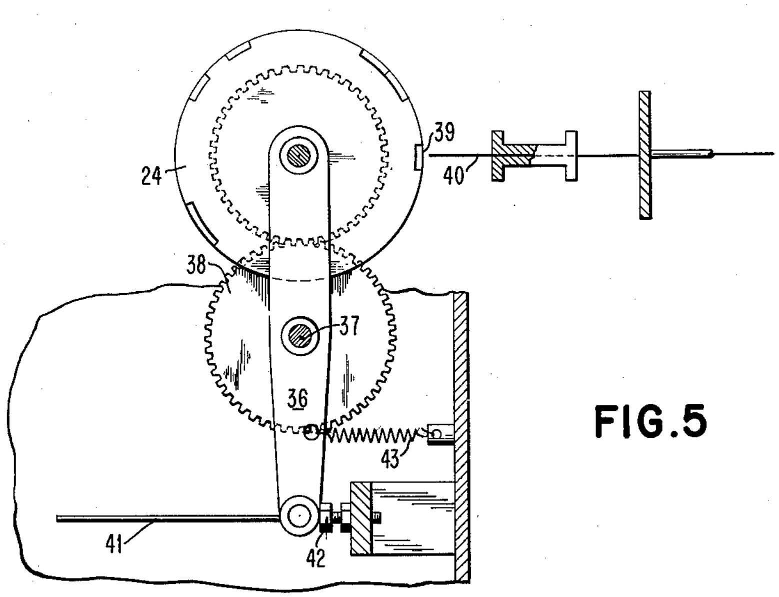
FIG. 5 is a side view of another embodiment showing a simple setup apparatus illustrating the contact action with the code drum thrown against the wires.

In FIG. 5 is shown a modification of this embodiment in which the code drum 24 is rotatably mounted on a rocker 36 which is pivotably supported by a shaft 37 which also supports a continuously rotating drum driving gear 38 in mesh with the code drum 24. When the character row 39 adjacent to the row of wires 40 corresponds to the desired character, a setup rod 41 moves to the left under the action of a clutch assembly (similar to that shown in FIG. 1) and rotates the rocker 36 clockwise about the shaft 37 away from the stop 42 against the tension of a spring 43. The drum is thereby thrown against the wires displacing those which are to print.

Figure 6:
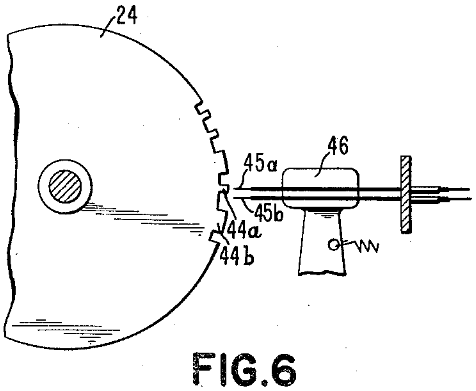
FIG. 6 is a side view of still another embodiment showing a code drum having the matrix wires of one character applied to it in two layers.

Another modification is shown in FIG. 6 wherein two code rows **44*a*, 44*b* and two rows of wires 45*a*, 45*b* are used; one row 45*a* having 18 wires, and the other row 45*b* having 17 wires. The length of the drum 24 is thereby halved but the number of code sectors in each peripheral track is doubled. To effect setup, the bell crank 46 may be operated as in FIG. 1, or the drum 24** can be moved as in FIG. 5.

Figure 7:
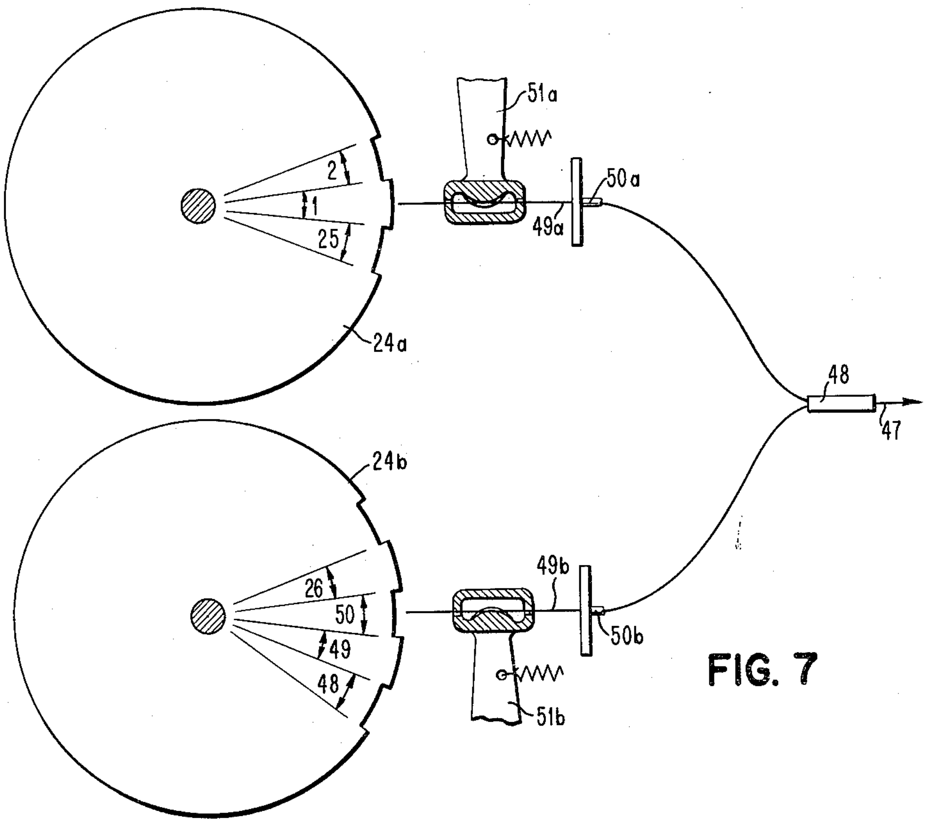
FIG. 7 is a side view of another embodiment showing a split print wire arranged with two drums so as to scan two character sectors simultaneously.
Figure 8:
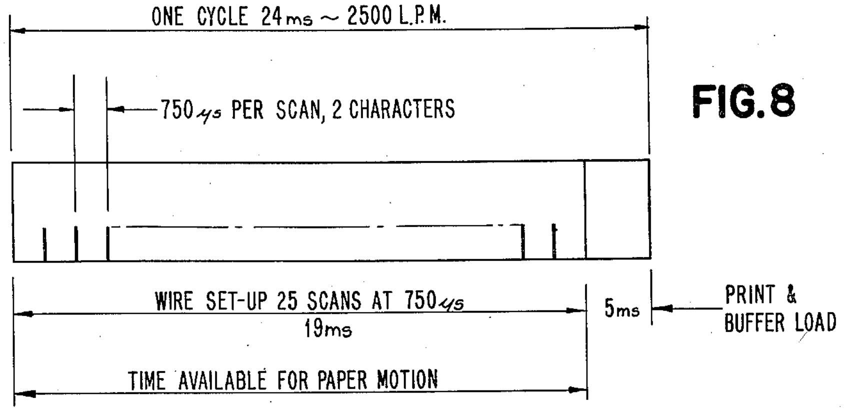
FIG. 8 is a timing chart of a print cycle employing the modification of FIG. 7.

FIG. 7 illustrates an embodiment of the invention modified to scan the same number of character code rows in half the time. The upper code drum **24*a* comprises sector number one through sector number twenty-five, representing the first half of the possible print characters, and the lower drum 24*b* carries sector number twenty-six through sector number fifty representing the last half of the possible characters. Sectors representing two characters are thereby presented at once allowing the scanning rate to be twice as fast without decreasing the scan time per character. Print wires 47 within tubes 48 are split into two rows of wires: the upper row of wires 49*a* within the tubes 50*a*, and the lower row of wires 49*b* within the corresponding tubes 50*b*. Since the wires are flexible, either of a pair of bell cranks 51*a* or 51*b* may be operated as before described to throw the correct row of wires against the respective drum depending on which drum 24*a*, 24*b* carries the desired character. Alternatively, either drum may be thrown against the respective row of wires as previously described. The timing chart of FIG. 8 illustrates the saving of setup time permitted by use of the modification shown in FIG. 7. Since only 25 scans are required in order to search all 50 characters, the scanning can be done in 19 milliseconds, which, with the same 5 millisecond print time, results in a printing rate of 2500 lines per minute. The same result could be had by using a code drum (24 in FIG. 1) with split wire rows 49*a*, 49*b*** mounted diametrically opposite each other and individually drivable.

*Setup control system*

Figures 9, 10:
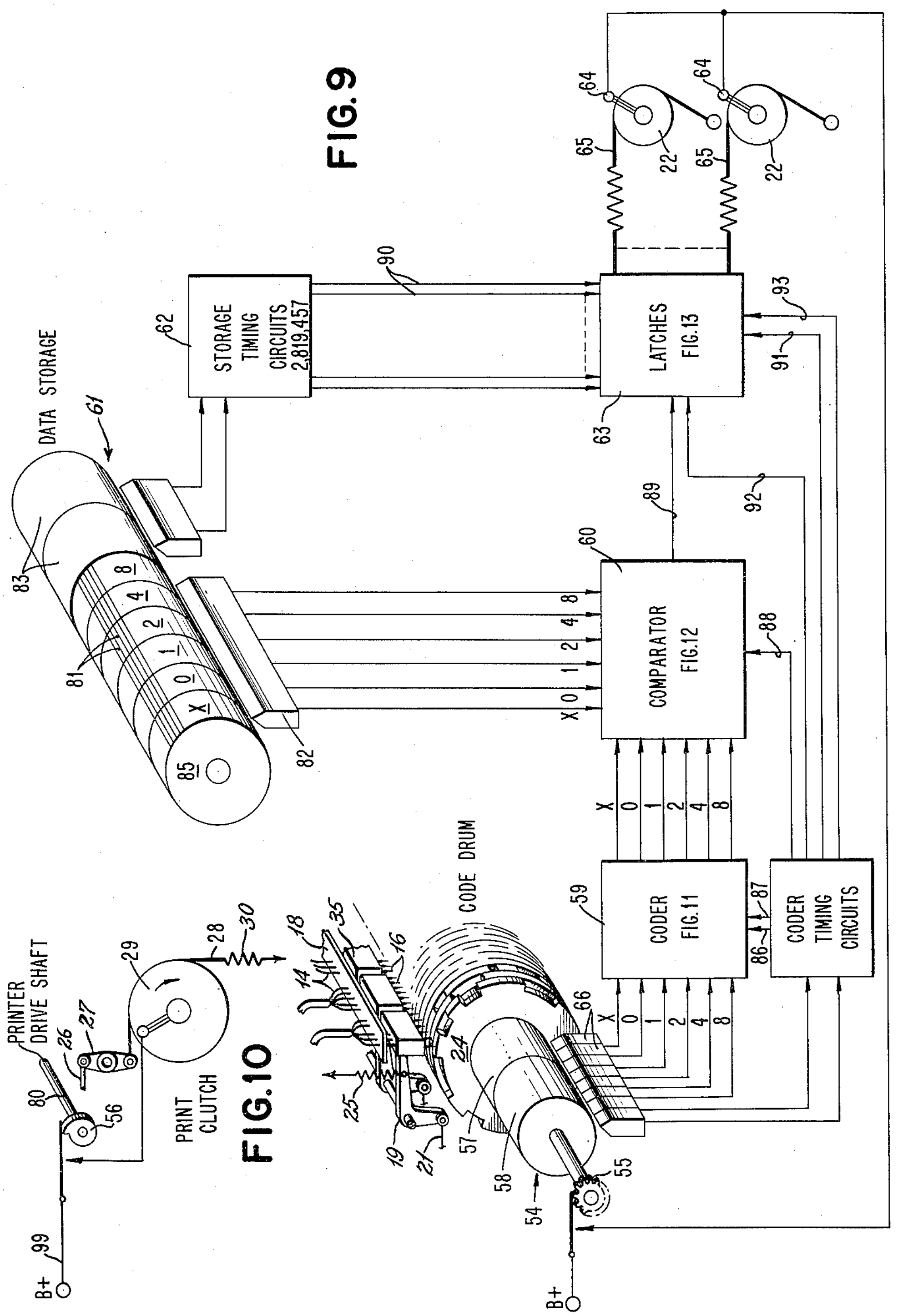
FIG. 9 is a schematic diagram of an illustrative control system for the device.
FIG. 10 is a schematic diagram of the print clutch shown in FIG. 1.

The essential features of a control system for a setup mechanism of this type are: means for comparing the code representation on the rows of code drum sectors with the character to be printed, and means to effect contact of the wires with the code drum when the comparing means indicates that the proper character code is adjacent to the wires. One illustrative control system is shown in FIG. 9, which is described in a form suitable for operating the device shown in FIG. 1 with the exception that the use of a single row of print wires 16, etc., representing 120 print positions is contemplated. The description which will now be given of the general diagram, FIG. 9, will be followed by a detailed description of the various circuit blocks of FIG. 9.

Figure 15:
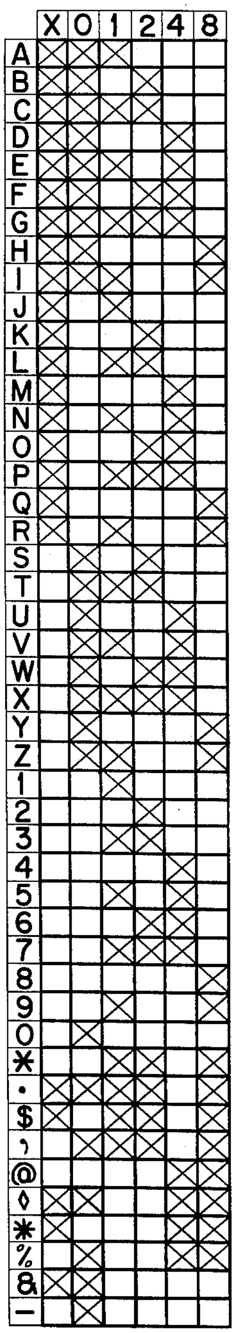
FIG. 15 is a chart showing the character code used in this embodiment.

In FIG. 9, the "code drum" 24 has a magnetic code drum 54 and a fifty-lobe circuit breaker 55 rotating synchronously therewith. For each row of code sectors representative of a possible print character on the code drum, there is a combination of code bits recorded on the magnetic code drum 54 representative of the character to be printed. Any suitable code may be used, the one contemplated being a modification of the well-known IBM code having the digits 1 through 9 converted to binary representations of 1, 2, 4 and 8, and having the zones 0, 11 and 12 converted to combinations of X and 0, forty-six characters of which are shown in FIG. 15. For example, an E in the IBM code is representated by a 12 and a 5; in the presently contemplated code the 12 would be represented by X and 0, and the 5 by a combination of 4 and 1, resulting in a code designation of X, 0, 1 and 4 to represent the letter E. The magnetic code drum 54 has six tracks 57 respectively corresponding to the data code bits X, 0, 1, 2, 4 and 8, and also has suitable timing tracks 58 that provide timing pulses for switching. Each of the code tracks 57 on the magnetic drum always corresponds to X, 0, 1, 2, 4 or 8, and spots are permanently recorded on the track selectively as determined by whether or not the character represented by the corresponding code row on the code drum 24 has a bit in the related bit position of its code; if the code bit does not appear in the code of the character, the magnetic drum is left blank at that spot. The magnetic drum code representations are used to set up triggers in the "coder" 59 which store the code bit (or no-bit) throughout the respective character scan time. The trigger outputs are then compared, in a "comparator" 60, against data representations in a like code coming from any suitable buffer storage device, the one contemplated being a "data storage" device which comprises a magnetic drum 85 having 120 longitudinal tracks 81 arranged serially on its periphery, in which are stored the data for the respectively corresponding 120 print positions. The data on the tracks 81 are in the same form as that on the code tracks 57 of the code drum 54. During character scan time, all 120 print positions are read by the reading heads 82 once for each of the 50 characters being scanned, as defined by the speed of the data storage drum being 50 times faster than that of the code drum. The data storage drum also comprises two timing tracks 83 which correspond to tracks 151 and 152 in FIG. 1*b* of U.S. Patent No. 2,819,457, Timing and Clocking Circuits, issued to F. E. Hamilton and E. S. Hughes, Jr., on January 7, 1958. The "storage timing circuits" 62 consist of ring circuits and other suitable circuitry similar to that in the Hamilton et al. patent but modified to provide 10 sector pulses, with 12 word pulses for each, thereby generating 120 print position pulses which are fed serially in time on 120 respectively associated wires 90 to print "latches" 63. Each print position has a pair of latches that store the indication of a successful comparison for that position, each latch being identified with the print position data from the storage drum by being combined with the print position pulse fed to the respective latch in an AND circuit. For each character on the "code drum," and therefore for each setup of the "coder" triggers, all 120 print positions are rippled serially through the comparator to test the "code drum" characters for identity with the character which is to be printed in each print position. The comparison of the "code drum" characters with the "data storage" characters takes place one character scan time before the actual setting up of the print wires. This is accomplished by having the magnetic code drum representations of the character advanced by one character (clockwise in FIG. 1) from the character on the mechanical code drum which they represent. Each print position latch will turn on and remain on as the result of a successful comparison relating to that print position, and at the start of the following character scan time (this being the time that the code row of the character to be printed appears beneath the print wires) the 50 lobe circuit breaker connects B-plus voltage to the brushes 64 on the center hub of the print position electrostatic clutches 22. Current then flows from the latch through the electrostatic clutch strap 65 effecting a clutching of the proper bell crank 19 and thereby bringing the print wires in contact with the drum. After all 50 characters have been scanned, the print clutch circuit breaker 56 (FIG. 10) connects B-plus 99 to the center of the print clutch, effecting a flow of current through its strap causing the clutch to engage, and thus rotating the rocker 27 (FIG. 1) counterclockwise to drive the rod 26 forward so as to cause an impression of the extended wires against the inked ribbon. The paper in the printer is stopped during the time that the print clutch is operated; this is also a suitable time for reloading the buffer storage for the next line of characters to be printed.

Figure 11:
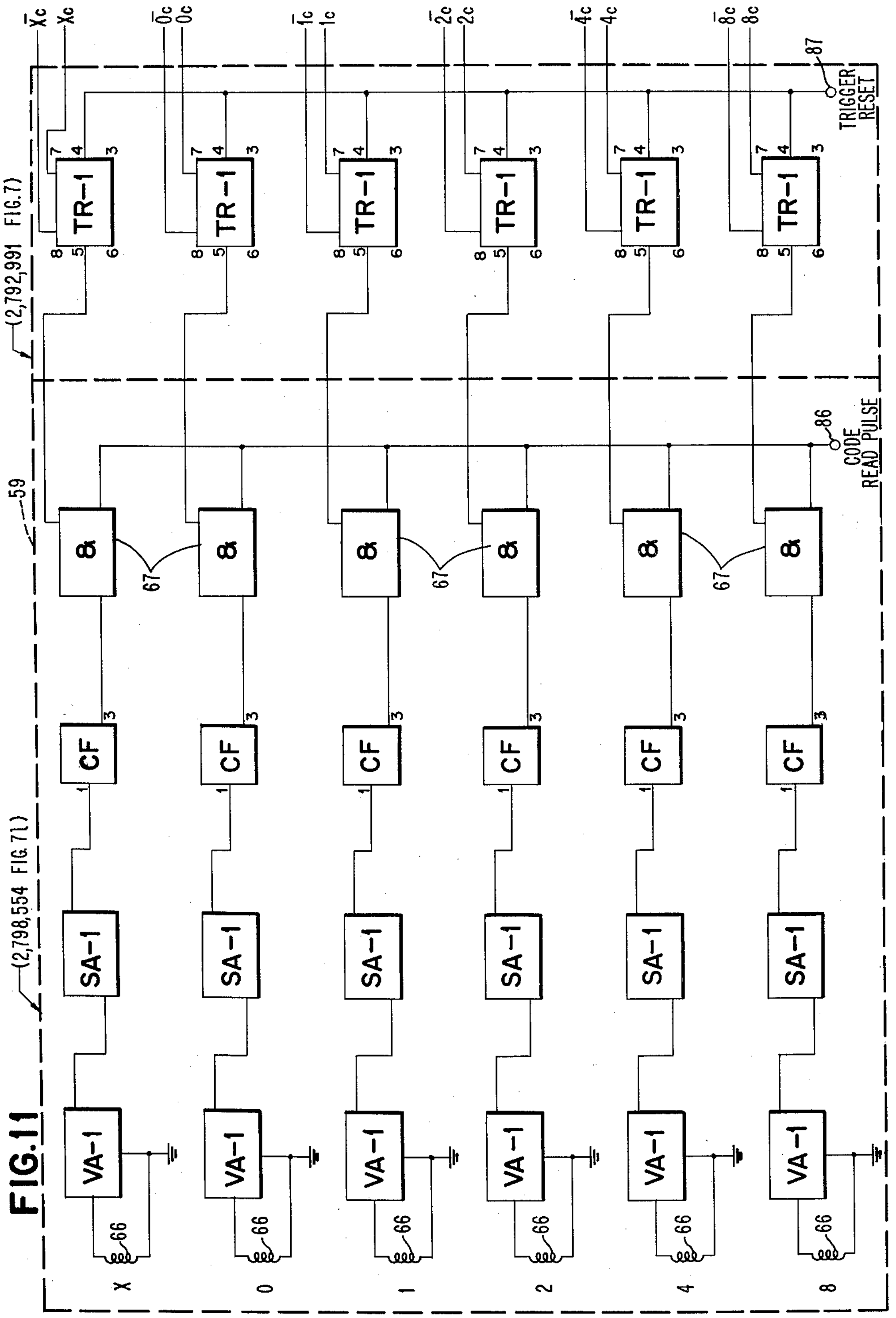
FIG. 11 is a schematic diagram of the "coder" of FIG. 9.

The "coder" 59, shown in FIG. 11 comprises the magnetic code drum read circuits and the coder triggers. All of the functional blocks representing electronic stages illustrated in this specification are described in detail in U.S. Patent No. 2,798,554, Data Transfer Apparatus, issued to C. B. Smith on December 30, 1955, with the exception of the triggers TR–1 which are described in detail and shown in Fig. 7 of U. S. Patent No. 2,792,991, Electronic Commutator for Calculators, issued to E. P. Di Cambio on May 21, 1957. Any suitable magnetic reading amplifier, for example, the one illustrated in Fig. 7–1 of the aforementioned Smith patent, may be used to turn on the corresponding trigger TR–1 in response to the presence of a magnetic spot on the magnetic code drum. As shown, each magnetic read head 66 is connected to a voltage amplifier VA–1 (Smith patent, Figs. 29 and 30) which in turn feeds a shaping amplifier SA–1 (Smith patent, Figs. 27 and 28) and a cathode follower CF (Smith patent, Figs. 42 and 43) whose output is combined with a "code read pulse" at terminal 86 in an AND circuit 67 (Smith patent, Figs. 9 and 10), which combination will turn on the respective trigger TR–1. If no magnetic spot appears, the corresponding trigger will remain off. When the trigger is on, the left-hand stage thereof conducts causing the anode 8 to have a low potential thereon; the right-hand stage being cut off, the anode 7 thereof will be at B-plus. It follows, therefore, that if a spot representing a code bit, for instance X, appears on the drum, the trigger will be turned on, and the right-hand anode 7 thereof representing the X will be at a high voltage while the left-hand anode 8 thereof will be at a low voltage. Similarly if no spot appears, the trigger will remain off and the left-hand anode 8 thereof will be at a high voltage representing a no-X, while the right-hand anode will be held at a low voltage by the current flowing through the right-hand stage. These bit and no-bit representations will be available until the triggers are reset at the end of electrical character scan time by the "trigger reset" line 87 going to terminal 4 of each trigger. While the triggers are so set, all 120 positions will be compared therewith in the "comparator" 60, which is shown in FIG. 12.

Figure 12:
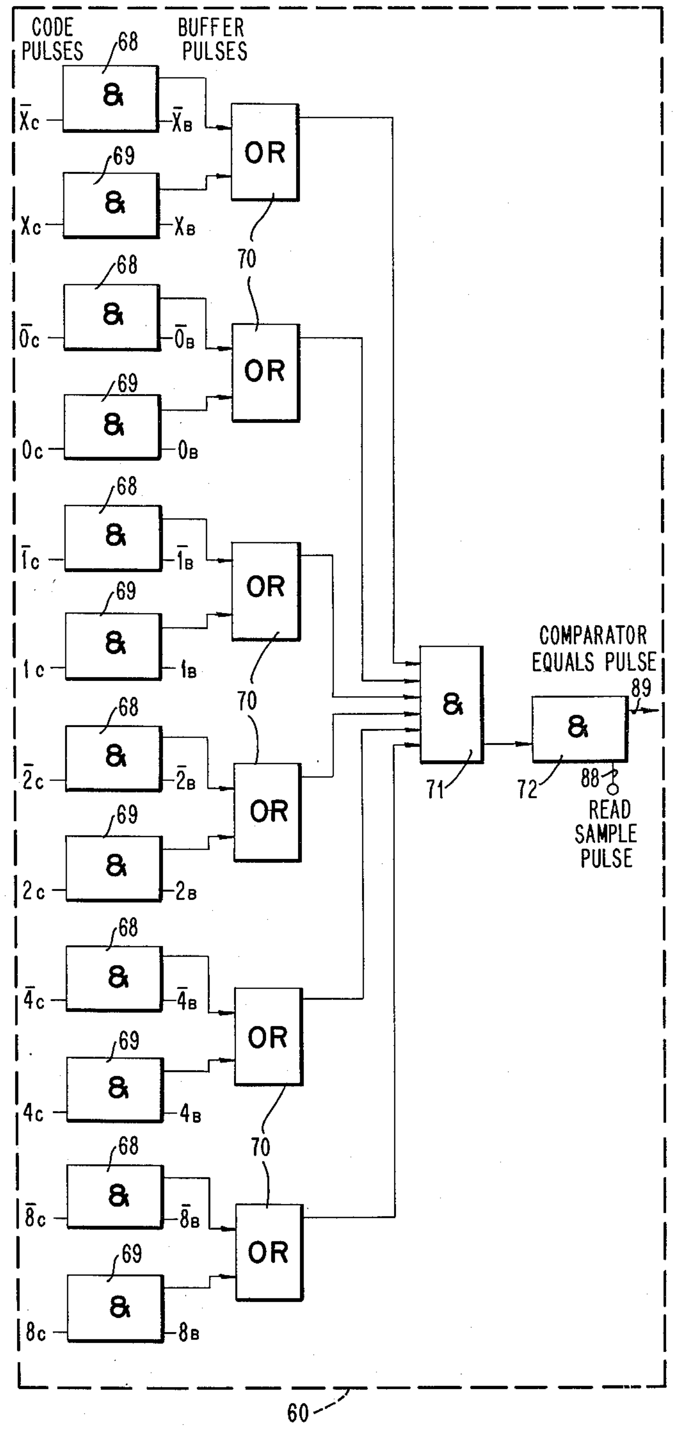
FIG. 12 is a schematic diagram of the "comparator" of FIG. 9.

The "comparator" 60 in FIG. 12 comprises twelve AND circuits 68, 69 in which each bit possibility, no-X, X, no-0, 0, no-1, 1, etc., are matched. Only those AND circuits 68, 69 at which signals from both the "data storage" and the "coder" appear, will provide an output to the corresponding OR circuit 70. The "code pulses" have the suffix "C" and are listed to the left of the AND circuits; the pulses from the "data storage" unit are called "buffer pulses," having the suffix "B," and are listed to the right of the AND circuits. The "code pulses" and "buffer pulses" must both be alike for all 6 code bit representations in order for there to be an output from the respective OR circuits 70 to feed the "coder" output AND gate 71. The output of the coder AND gate 71 is optionally matched in an AND circuit 72 with a "read sample pulse" at a terminal 88 to shape and define the coder output pulse; the resulting "comparator equals pulse" is fed over a line 89 to all the individual print position "first latches" 73 (FIG. 13) to indicate that a successful comparison has been made.

Figure 13:
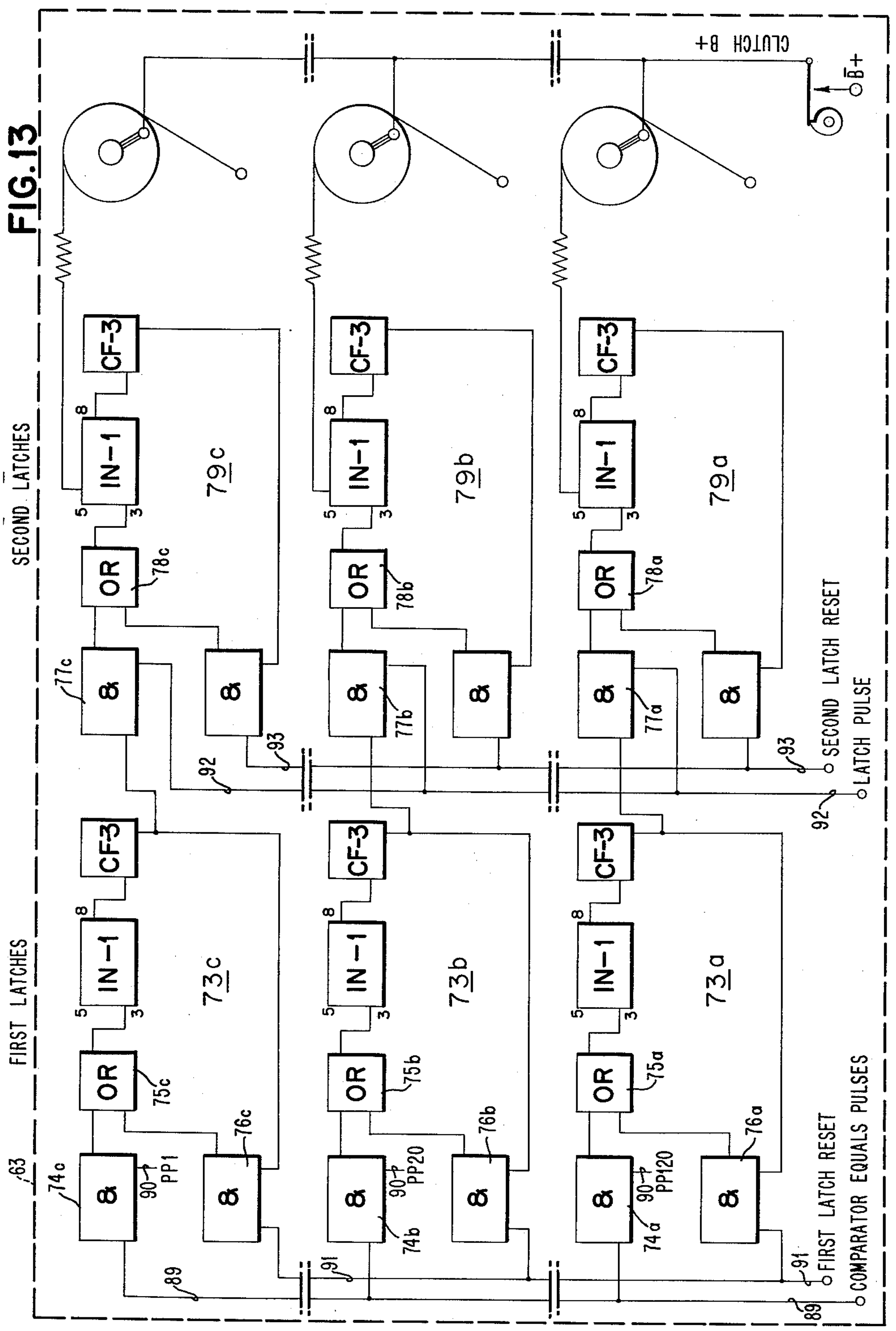
FIG. 13 is a schematic diagram of the "latches" of FIG. 9, for operating setup clutches.

The print position "latches" 63 (FIG. 9) are illustrated in FIG. 13, which shows by way of example three of the 120 pairs of print position latches; these latches are identical with those described in, and illustrated in Fig. 45, of the aforementioned Smith patent. In each latch, an input AND circuit 74 requires the coincidence of the "comparator equals pulse" on line 89 from the "comparator" 60 (FIG. 12), indicating a successful comparison, and a print position ring pulse ("PP1," "PP20," etc.) applied to terminals 90 from the "storage timing circuits" 62 (FIG. 9), indicating that this is the latch to which the successful comparison pertains. When these coincident pulses appear, the AND circuit 74 gives an output which is fed to the double inverter IN–1 through the input OR circuit 75, and the double inverter output is coupled through a cathode follower CF3 back to the latching AND circuit 76 whose other input, a "first latch reset" signal on a line 91, is high except during reset time, therefore providing a steady signal to the input OR circuit 75 and maintaining the first latch 73 on. The output of the first latch will be maintained at the input AND circuit 77 of the corresponding "second latch" 79 until the end of comparing time, which is the entire period of the character scan time that precedes by one character the actual mechanical character scanning time, coincidence with which is necessary for print wire setup. At the end of comparing time, and just prior to resetting the "first latches" by the "first latch reset" pulse on line 91, a "latch pulse" appears at the other input 92 of the second latch input AND circuit 77 causing the AND circuit to turn the double inverter on through the input OR circuit 78, and the second latch 79 will turn on. Each of the "second latches" 79 is modified from that shown in the Smith patent in that the anode 5 of each double inverter IN–1 has an alternate path to B-plus which is through the respective electrostatic clutch 65 to a clutch B-plus line previously described as operating on a fifty lobe circuit breaker 55 (FIG. 9) in synchronism with the "code drum" 54. The two latches 73, 79 are required in order to insure that the clutch will have one entire character scan time in which to operate so that the print wires will have sufficient time to make contact with the "code drum" and retract therefrom before the protrusions of the adjacent code row come into tangential contact therewith. The "second latches" 79 are reset at the end of mechanical scanning time by the "second latch reset" line 93 in preparation for receiving voltages corresponding to the next line of print. It is to be noted that each pair of print position latches will be operated only once per buffer load, only once per revolution of the code drum and only once per line of print.

*Operation and timing*

Figure 14:
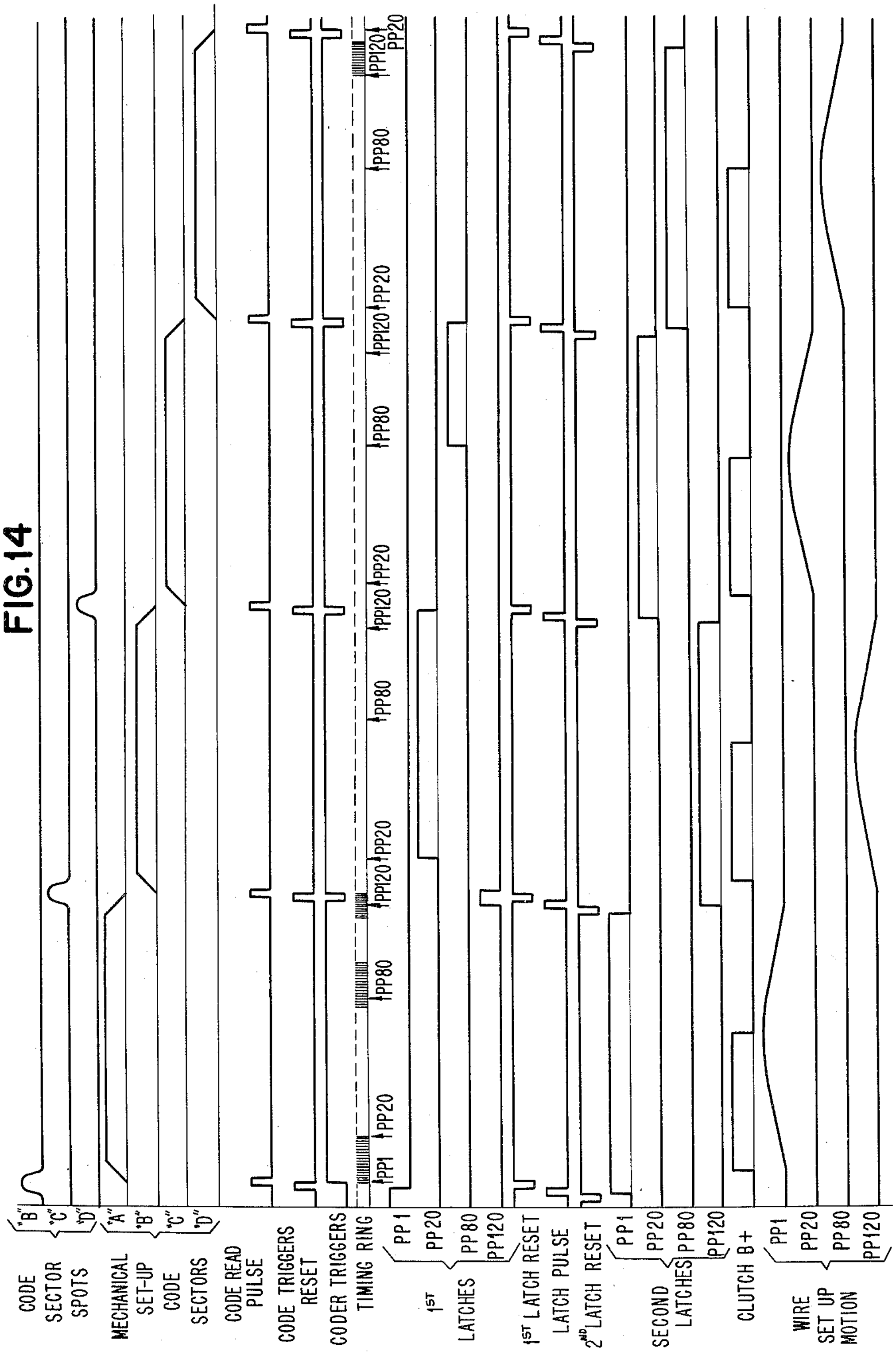
FIG. 14 is a timing diagram showing the pulse relationships of the illustrative control system.

A timing diagram representing the scanning of four out of fifty characters for this type of control system is shown in FIG. 14, which will be described starting at the top thereof. The "code sector spots" are illustrative of the time that the magnetic spots appear beneath the magnetic read head 66 for the various characters indicated. The "mechanical setup code sectors" are one character scan time behind the "code sector spots," as previously mentioned. For the purpose of illustration, it is assumed that the characters are laid about the drum in the order of A, B, C, D, etc., although any convenient order of character sequence could be used. A "code read pulse" 86 (FIG. 11) is made to coincide with the "code sector spots" in order to set up the triggers; this "code read pulse" begins during the "code triggers reset" pulse 87 (FIG. 11) and extends sufficiently long thereafter to insure that all triggers TR–1 (FIG. 11) will first be turned off, and those triggers which are to be turned on as a representation of the character on the code drum will do so. The "coder triggers" TR–1 remain either on or off for nearly the entire scan time. Below the "coder triggers" pulses there is shown a train of pulses representing the print position "timing ring" in the "storage timing circuits" 62 shown in FIG. 9. It can be seen that the print position "timing ring" ripples through all 120 print positions in less than a complete character scan time. In the present embodiment, with a 1440 line per minute printer utilizing 37.5 milliseconds for setup time, previously described as allowing 750 microseconds character scan time per character, there would be time to scan 125 print positions, allowing six microseconds per print position. This results in the overshooting of five print positions every character scan time which causes the print position "timing ring" to advance in relation to the character scan times. However, this is not important since, regardless of which print position is compared first, there is ample time for all print positions to be compared during each character scan time. Assuming that print position 1 is to print an A, print position 20 is to print a C, print position 80 is to print a D, and print position 120 is to print a B, the setting up of the latches 63 will be as follows. The "coder triggers" TR–1 go on in response to the "code sector spots" for the letter B; in this case, according to the modified IBM code in use, the X, 0 and 2 triggers only will have gone on, there then being an X, a 0, a2, a no-1, a no-4 and a no-8, all to be compared with the buffer output. As soon as the triggers go on, each of the buffer storage tracks corresponding to each print position is read serially in turn into the "comparator" 60 to be compared with this character code. The only time that a "comparator equals pulse" 89 becomes available from a successful comparison is at the time when the data on the track corresponding to print position 120 is being fed into the "comparator"; this is the same time that the print position 120 ring pulse ("PP120," FIG. 13) has enabled the print position 120 latch 73*a* to go on in coincidence with a successful equals pulse 89. Referring now also to FIG. 13, the print position 120 latch 73*a* goes on toward the end of the scan time for the letter B. Shortly thereafter the "latch pulse" 92 appears at the input AND circuits 77 for all the "second latches ," but since print position 120 latch 73*a* is the only one of the first latches 73 which is on, print position 120 second latch 79*a* will be the only one of the "second latches" 79 to be turned on. As soon as the print position 120 second latch 97*a* is on, the "first latch reset" pulse drops to zero turning off the print position 120 first latch 73*a*. Print position 120 second latch 79*a* will remain on throughout the following scan time, during which time the mechanical code sector representing the letter B will become available to the print wires. During this same time the "coder" triggers TR–1 have been set for the letter C and the "data storage" 61 output for each of the 120 print positions is rippled through the "comparator" 60 to determine which of the print positions are to print a letter C. At print position 20 time, a successful comparison is made and an equals pulse 89 appears at the output of the "comparator" 60. This turns on the print position 20 first latch 73*b*, early in the scan time, which remains on to the end of electrical scan time for the letter C. At the end of the scan time the "latch pulse" comes along line 92 again and combines with the print position 20 first latch 73*b* output in the input AND circuit 77*b* of the print position 20 second latch 79*b*, turning the latter on. As before, the print position 20 second latch 79*b* will remain on for the entire mechanical scan time for the letter C (the third scan time in FIG. 13), during which time the "coder" triggers TR–1 are set up for the letter D. When the timing ring ripples around to print position 80, the "comparator" 60 again has a successful comparison output pulse 89 and the print position 80 first latch 73*c* is turned on, in about the middle of the scan time. The B-plus line (FIG. 9) from the 50 lobe circuit breaker 55 rotating synchronously with the "code drum" 54 applies B–plus to the center brush 64 of each and every setup clutch 22 for about one-half of every scan time. No current can flow through the clutch however unless the first stage of the latch double inverter IN–1 in the corresponding one of second latches 79 is conducting. This will occur when the latch 79 is turned on as before described.

After the print wires 16, etc., have been displaced in their tubes 14, etc., by contact with the drum 24, following a complete scan of 50 characters by all 120 print positions, the print clutch circuit breaker 56 (FIG. 10) rotating on a printer drive shaft 80, will make a connection from B-plus on the line 99 to the print clutch 29 allowing current to flow through the clutch so that the clutch will become engaged and rotate the rocker 27 counterclockwise about its pivot driving the print rod 26 to the left in FIG. 1 and causing an impression on the inked ribbon by the displaced wires 16 in the print head 12. Each print head 12, 13, etc., may have a separate print clutch, or a single print clutch could be used to drive a bail common to each of the print rods 26. Although it is contemplated in the present embodiment to effect printing of all print positions during the time that the paper is stopped, they having been set up while the paper was moved from one print line to the next print line, this invention is equally suitable for use in a printer of the type in which each print head may be driven forward to make an impression according to any plan or at random. For instance, if the paper were stationary during scan of the entire 50 characters, each print head could be caused to make an impression immediately following the setup of the wire therein.

The control system described will adequately provide for the setting up of print wires in the modification of the embodiment illustrated in FIG. 5 in either of two ways. The first way would be to have one small code drum for each print head, thus permitting the movement of each of the plurality of code drums against the wires when a proper comparison has been made. The second way of doing this would be to have a common code drum, as before, and have the code drum brought up against all of the wires each time a successful comparison is made, followed by a removal from drum proximity of the sets of print wires correctly set up; this would prevent correctly displaced print wires from being redisplaced in an incorrect manner as successive sets of print wires were set up by bringing the drum in contact with the group. The illustrated control system would work without alteration on the modification of the embodiment shown in FIG. 6. The modification shown in FIG. 7 would have to be provided with two sets of latches and electrostatic clutches per print position in order to utilize the control system before described. In that way, either set of print wires 50, 52, could be brought into contact with its respective code drum when the correct code character had appeared. A further required modification would be the provision of two magnetic code drums, or two sets of code spots on a single magnetic code drum, feeding two sets of coder triggers, whose output would be fed to two separate comparators. Both comparators would receive the buffer storage output synchronously, but each comparator would receive a different coder bit combination and would feed its own output separately to one set of latch pairs corresponding to one of the drums. The relative timing shown in FIG. 14 would remain the same, the only difference being the simultaneous scanning of two characters resulting in an overall scan time for 50 characters half of that for the device previously described. For the modification of the invention shown in FIG. 1, including two parallel rows of 60 print positions in each row, a delay device would be required so as to effect setting up of the second latch one scan time later for the right-hand row of print wires 17 than the setting up of the left-hand row of print wires 16. This delay could be the addition of third latches, to be operated by the "second latches" and an additional latch pulse, which would appear just prior to, and overlap with, the "second latch reset" pulse. This third latch would operate the clutch in the same way as do the "second latches" in the embodiment described.

As before mentioned the particular control system is not critical to the invention. Any other suitable scheme that provides a means for comparing the code character on the drum with the character to be printed would be suitable. Such a device could be established by having a 50 segment commutator rotating synchronously with the code drum which could be provided with six tracks to use the same code as before described, or with a single track having segments connected to a matrix for indicating a successful comparison. Although the present control system was described as rippling all 120 print positions serially through the comparator during each character scan time, the print positions could be presented to a multiple comparison circuit in parallel fashion, which would simplify the mode of operation and the timing circuits, but would require 120 comparing circuits. The spirit of the invention envelopes modifications including any number of print heads.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A wire printer comprising a bundle of print wires arranged in an orderly pattern at the control ends thereof, a plurality of wire displacing element groups each arranged in a similar pattern to said print wire pattern, means for continuously moving successive ones of said groups past the control ends of said wires, successive groups being adapted to displace said print wires differently so as to form different character patterns therein, means for generating a representation of the character formable by each of said groups as it approaches said print wires, means for storing a representation of a character to be printed, means for comparing said representations so as to produce a signal indicative of like character representations, means for selectively effecting contact between each of said groups and said print wires, and means responsive to said signal for operating said contact effecting means.

2. In a wire printer of the type in which the printing impression is made by print wires selectively displaced from the normal plane of a group of said wires arranged in a matrix and in which the selected print wires may be displaced at one time and the impression made thereafter, the combination comprising a continuously and cyclically moving displacing means having a plurality of groups of character generating configurations so arranged within each group as to render it possible to displace selected wires of the group in a manner which will define a character to be printed by bringing said means and said wires into mutual contact, and means for effecting said mutual contact at a time when one of said groups presents a configuration of discontinuities capable of effecting displacement of correct certain ones of said wires so as to define a desired print character.

3. In a wire printer having print wires slidably disposed within guide tubes and extending therefrom, the combination comprising a continuously, cyclically moving wire-setting device adapted for setting up different characters when different portions thereof successively presented to the print wires during said cyclical movement are brought into contact with said wires, means for confining the guide tubes so as to be disposed normally from said device in a regular pattern, means for effecting relative motion of the guide tubes and said device towards each other so that the print wires extending from the guide tubes contact said device for setting up a character, means for continuously developing signals representative of the respective print characters settable by contact between said device and the wires as said setting device cycles, means for developing signals representing a character that is required to be set up, means for comparing said signals so as to produce an equals signal when said characters are alike, and means responsive to said equals signal for operating said relative motion means.

4. In a wire printer, a plurality of wire setting instrumentalities arranged in arrays, each array comprising a unique configuration of physical elements, there being a different array for each character selectable to be printed, means for cyclically presenting to the wire ends a continuous succession of said arrays of wire setting instrumentalities, means to generate a signal at a selected differential time in the cycle of presentation of said arrays of wire setting instrumentalities to control the selection of a particular one of said arrays, and means responsive to said signal for bringing the wire ends and a selected one of said wire setting instrumentalities into mutual contact to displace particular wires of the group conformably to the unique configuration of physical elements of the selected array.

5. In a wire printer having print wires slidably disposed within guide tubes and extending therefrom, a wire setting device comprising a continuously rotating wire-setting code drum, means for confining the guide tubes so as to be disposed radially from said drum in a regular pattern, means for effecting relative motion of the guide tubes and said drum towards each other so that the print wires extending from the guide tubes contact said drum, means for continuously developing signals representative of the respective print characters that would be set up by contact between said drum and the wires as said drum rotates, means for developing signals representing a character that is required to be set up, means for comparing the signals from said first and second mentioned signal developing means for producing an equals signal when said signals are alike, and means responsive to said equals signal for operating said relative motion means.

6. A wire printer comprising a group of print wires arranged in a matrix at the print end thereof and arranged in an orderly array at the setup end thereof; a continuously rotating drum disposed adjacent the setup ends of said print wires; a set of sectors on the surface of said drum for each character selectable to be printed, each set arranged in the same array as said print wires so that as said sets revolve past said print wires each sector becomes aligned with a print wire, each sector comprising a recess in the ones of said sets in which the corresponding print wire is not to effect an impression in the printing of the character corresponding to that set; means for presenting a coded manifestation of a character to be printed; means for presenting coded manifestations of the characters respectively corresponding to said sets revolving past said group of print wires; means for comparing the coded manifestations of said two presenting means to produce a signal upon presentation of like manifestations; and means responsive to said signal for effecting longitudinal impact of said print wires with said drum so as to displace those wires utilized in impressing the desired character.

7. In a wire printer, a continuously rotating code drum, a group of print wires disposed so that their ends are presented in a predetermined pattern to the surface of said drum, said drum surface being subdivided into a number of areas each having a configuration conforming to said pattern of print wire ends, there being one of said areas for each possible character to be printed and said areas being arranged so as to be presented in sequence to said pattern of wire ends as said drum rotates, means for relatively moving said drum and said print wire ends to bring them into contact, the drum surface within each of said areas being characterized by a unique arrangement of wire setting surfaces adapted to cause certain ones of said group of wires to be projected beyond the other wires of the group when said wire ends and said drum surface are moved into contact, and means for selectively moving said code drum and said print wire ends into contact at any one of a plurality of differential times during the rotation of said drum, said differential times respectively corresponding to the times of presentation of the respective areas of said drum to said group of print wire ends.

8. A wire printer comprising a plurality of print wires arranged at the printing end to form a matrix for effecting printing impressions and arranged at the other end in an orderly array; means for selectively displacing said print wires comprising a continuously rotating drum having a plurality of sets of sectors disposed on the surface thereof so as to be presented in sequence to said wires as said drum rotates, each set arranged in said orderly array, each one of said sets corresponding to a character selectable to be printed, each sector in each set comprising a projection or recess relatively with respect to the other sectors in the set to thereby characterize said array so as to project certain ones of said wires beyond the others in a manner to form the respectively corresponding character; means for presenting a coded manifestation of a character to be printed; means for continuously presenting a succession of similarly coded manifestations of the characters formable in said matrix by the extension of certain ones of said print wires according to the successive sets of projections and recesses presented by said drum; means for comparing said coded manifestations; selectively operable means for effecting contact between said wires and said drum; and means responsive to said comparing means for operating said contacting means.

9. In a wire printer, a bundle of print wires arranged in a row; a continuously rotating code drum having axial rows of recesses on the peripheral surface thereof, there being one of said rows for each character selectable to be printed, the arrangement of recesses in each row being such as to leave unrecessed areas of the drum between recesses corresponding to the print wires to be displaced for the character apertaining to the row; and means for selectively effecting contact between the print wires and said drum at differential times corresponding to respective ones of said rows, to project certain ones of said wires beyond the others.

10. A wire printer setup device comprising a continuously rotating code drum having axial rows of recesses about the periphery thereof, each said row having a unique arrangement of recesses corresponding to a respective character which may be printed, means for sensing the position of said rows as said drum rotates, means for effecting contact between the print wires and said character rows, and control means responsive to said sensing means for selectively operating said contact effecting means.

11. A wire printer of the type in which the wires utilized to make the characteristic impression are displaced from the normal plane of the print wire matrix prior to the printing impression, comprising, in combination with said wires; a continuously rotating code drum having axial rows of recesses in different patterns on the surface thereof, there being one of said rows for each character selectable to be printed, the recesses in each row being aligned with the wires which are not utilized in the printing of the respectively corresponding character; means for developing a representation of the character corresponding to each of said rows of recesses passing said wires as said drum rotates; means for storing a representation of a character to be printed; means for continuously comparing the representation of the character corresponding to said passing row of recesses with the stored representation of the character to be printed; means for effecting contact between the print wires and said character drum; and control means responsive to said comparing means for operating said contact effecting means when the respective one of said rows of recesses corresponding to said stored representation bears the proper relation with said wires.

12. In a wire printer having a plurality of print wire sets adapted to simultaneously print a line of characters, the combination comprising a continuously moving character setting device, a plurality of means for holding the sets of print wires adjacent and normal to said device, a plurality of means for effecting contact of said device with the respective sets of print wires as said device moves, code means for presenting continuously as said device moves a manifestation of the character which would be set up in the print wire sets by contact of the device therewith, data means for presenting manifestations of the characters to be printed respectively by the several wire sets, means for comparing each of the manifestations developed by said data means with each manifestation developed by said code means, and means responsive to said comparing means for selectively operating each of said plurality of contact effecting means when said comparing means indicates that the manifestation developed by said code means matches the manifestation developed by the one of said data means corresponding therewith.

13. In a wire printer having a plurality of print wire sets adapted to simultaneously print a line of characters, the combination comprising a continuously rotating character setting drum, a plurality of means for holding the sets of print wires radially adjacent said drum, a plurality of means for effecting contact of said drum with the respective sets of print wires as said drum rotates, code means for presenting in continuous succession as said drum rotates manifestations of the characters which would be set up in the print wire sets by contact of the drum therewith, data means for presenting manifestations of the characters to be printed respectively by the several wire sets, means for comparing each of the manifestations developed by said data means with each manifestation developed by said code means, and means responsive to said comparing means for selectively operating each of said plurality of contact effecting means when said comparing means indicates that the manifestation developed by said code means matches the manifestation developed by the one of said data means corresponding therewith.

References Cited in the file of this patent

UNITED STATES PATENTS

| | | |
|---|---|---|
| 2,486,985 | Ruderfer | Nov. 1, 1949 |
| 2,524,127 | Johnson | Oct. 3, 1950 |
| 2,730,040 | Johnson | Jan. 10, 1956 |
| 2,757,604 | Von Glahn | Aug. 7, 1956 |
| 2,773,443 | Lambert | Dec. 11, 1956 |
| 2,785,628 | Furman | Mar. 19, 1957 |
| 2,802,414 | Johnson | Aug. 13, 1957 |
| 2,818,800 | Orrange | Jan. 7, 1958 |
| 2,829,593 | Rex | Apr. 8, 1958 |
| 2,869,455 | Knutsen | Jan. 20, 1959 |